(12) United States Patent
Horie

(10) Patent No.: US 10,356,257 B2
(45) Date of Patent: Jul. 16, 2019

(54) INFORMATION PROCESSING APPARATUS, NON-TRANSITORY COMPUTER READABLE MEDIUM, AND INFORMATION PROCESSING METHOD FOR PRESENTING A CONTACT NAME

(71) Applicant: FUJI XEROX CO., LTD., Tokyo (JP)

(72) Inventor: Daigo Horie, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 24 days.

(21) Appl. No.: 15/440,609

(22) Filed: Feb. 23, 2017

(65) Prior Publication Data
US 2018/0048775 A1 Feb. 15, 2018

(30) Foreign Application Priority Data
Aug. 9, 2016 (JP) .................................. 2016-156771

(51) Int. Cl.
*H04N 1/00* (2006.01)
*H04L 29/12* (2006.01)

(52) U.S. Cl.
CPC ..... *H04N 1/00413* (2013.01); *H04L 61/1594* (2013.01); *H04N 2201/0093* (2013.01)

(58) Field of Classification Search
None
See application file for complete search history.

(56) References Cited

U.S. PATENT DOCUMENTS

2013/0304861 A1* 11/2013 Gupta .................... H04L 67/10
  709/217
2016/0277353 A1* 9/2016 Shinji .................... G06F 13/00

FOREIGN PATENT DOCUMENTS

| JP | H10-269816 A | 10/1998 |
| JP | H11-205516 A | 7/1999 |
| JP | 2006-080730 A | 3/2006 |
| JP | 2007-288574 A | 11/2007 |
| JP | 2007288574 A | * 11/2007 |

* cited by examiner

*Primary Examiner* — Andrew H Lam
(74) *Attorney, Agent, or Firm* — Oliff PLC

(57) ABSTRACT

An information processing apparatus includes a presentation unit that, if there is no contact name registered in a contact list in which a contact name representing a name indicative of a contact and multiple pieces of destination information are associated with each other, presents a contact name that includes an attribute of the contact or destination information indicative of a destination of transmission for the transmitting application of interest.

11 Claims, 12 Drawing Sheets

FIG. 6

| PRIORITY | CONTACT NAME CANDIDATE |
|---|---|
| 1 | FIRST NAME, LAST NAME |
| 2 | FIRST NAME |
| 3 | LAST NAME |
| 4 | COMPANY NAME |

CONTACT LIST    SELECT DESTINATION.

| USER ID | CONTACT | SELECTION |
|---|---|---|
| 1 | FUJI TARO | ☐ |
| 2 | JIRO | ☐ |
| 3 | FxxxXxxxx CORPORATION | ☐ |
| 4 | SUZUKI | ☐ |
| 5 | SABURO SATO | ☐ |
| 6 | 0123456789 | ☐ |

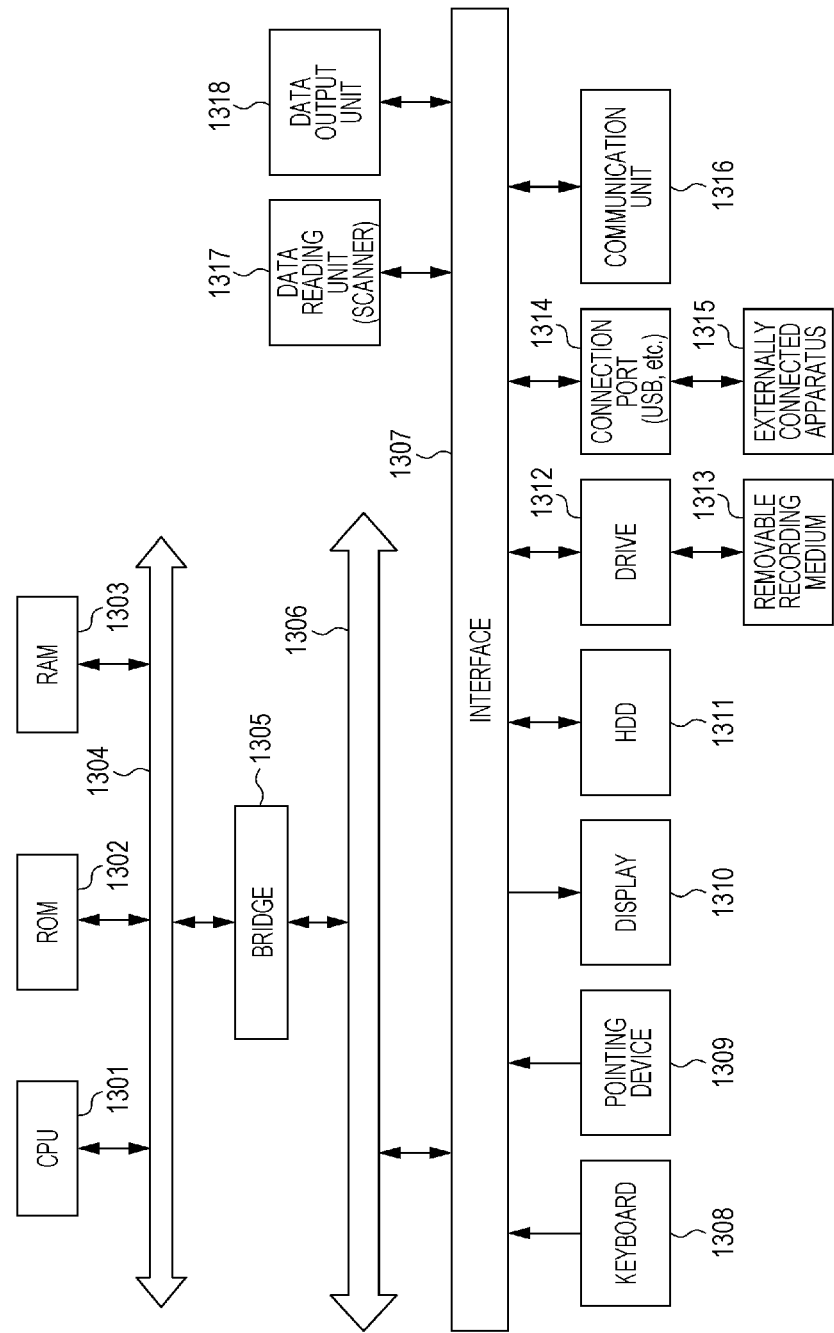

INFORMATION PROCESSING APPARATUS, NON-TRANSITORY COMPUTER READABLE MEDIUM, AND INFORMATION PROCESSING METHOD FOR PRESENTING A CONTACT NAME

CROSS-REFERENCE TO RELATED APPLICATIONS

This application is based on and claims priority under 35 USC 119 from Japanese Patent Application No. 2016-156771 filed Aug. 9, 2016.

BACKGROUND

Technical Field

The present invention relates to an information processing apparatus, a non-transitory computer readable medium, and an information processing method.

SUMMARY

According to an aspect of the invention, there is provided a presentation unit that, if there is no contact name registered in a contact list in which a contact name representing a name indicative of a contact and multiple pieces of destination information are associated with each other, presents a contact name that includes an attribute of the contact or destination information indicative of a destination of transmission for the transmitting application of interest.

BRIEF DESCRIPTION OF THE DRAWINGS

Exemplary embodiment of the present invention will be described in detail based on the following figures, wherein:

FIG. 6 illustrates an exemplary data structure of a rule table;

FIG. 7 illustrates an exemplary process according to the exemplary embodiment;

FIG. 13 is a block diagram illustrating an exemplary hardware configuration of a computer that implements the exemplary embodiment.

DETAILED DESCRIPTION

An exemplary embodiment of the present invention will be described below with reference to the drawings.

Figure 1:
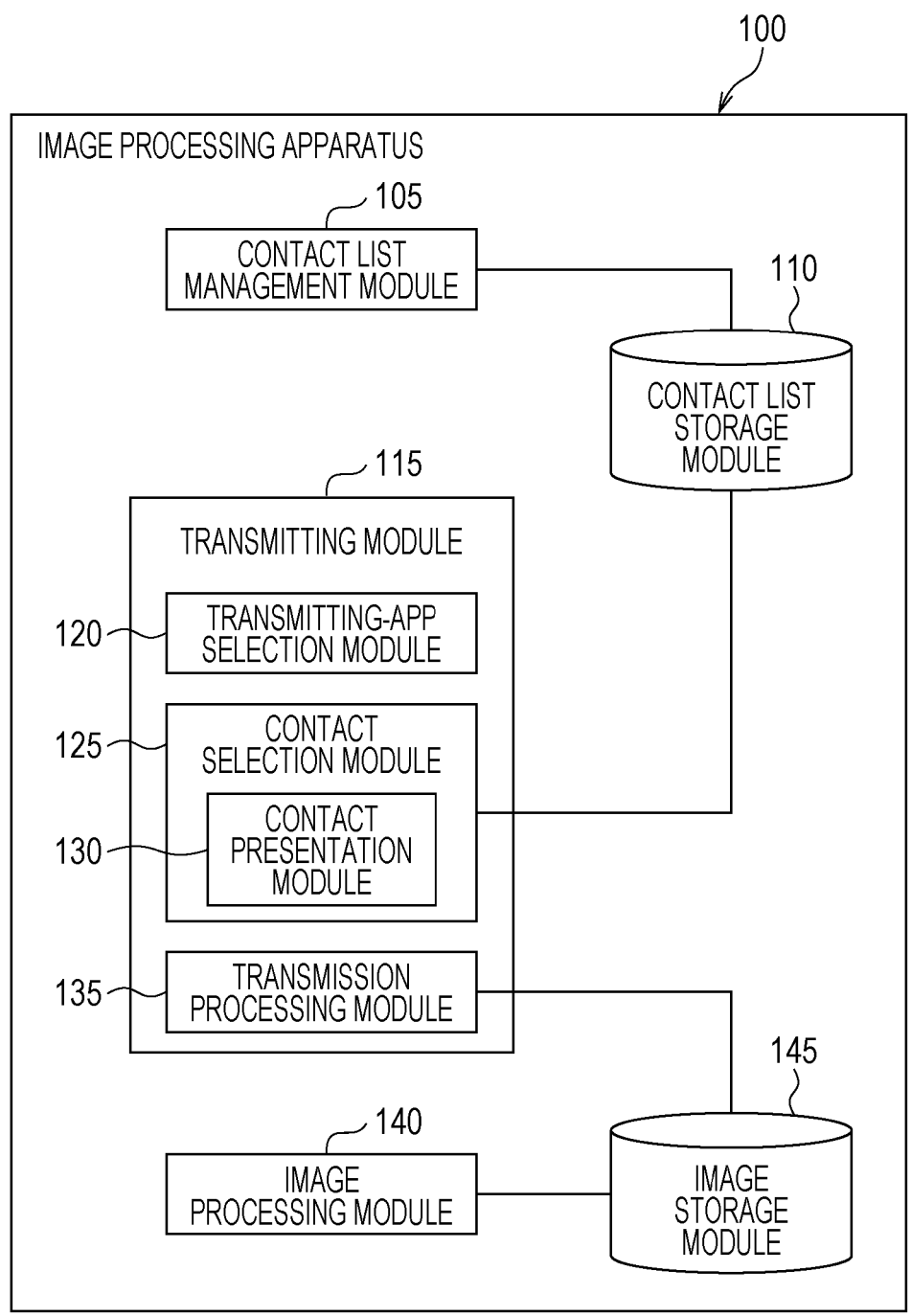
FIG. 1 is a conceptual module diagram of an exemplary configuration according to the exemplary embodiment.

FIG. 1 is a conceptual module diagram of an exemplary configuration according to the exemplary embodiment.

The term "module" generally refers to a logically separable component such as software (computer program) or hardware. Therefore, the term "module" as used in the exemplary embodiment refers to not only a module in a computer program but also a module in a hardware configuration. Thus, the exemplary embodiment will be also described in the context of a computer program for providing functions of such modules (a program for causing a computer to execute individual procedures, a program for causing a computer to function as individual units, and a program for causing a computer to implement individual functions), a system, and a method. Although "store", "be stored", and equivalent expressions are used herein for the convenience of description, these expressions mean, when an exemplary embodiment relates to a computer program, "cause a memory to store" or "control a memory so as to store". Although individual modules and functions may have a one-to-one correspondence, in actual implementation, a single module may be implemented by a single program, or multiple modules may be implemented by a single program. Conversely, a single module may be implemented by multiple programs. Further, multiple modules may be executed by a single computer, or a single module may be executed by multiple computers that are in a distributed or parallel environment. A single module may include another module. In the following description, the term "connection" refers to not only a physical connection but also a logical connection (such as exchanging of data, issuing of an instruction, and cross-reference between data items). The term "predetermined" as used herein means being determined prior to a process of interest, which not only means being determined before processing according to the exemplary embodiment begins but also being determined, even after the processing according to the exemplary embodiment begins, at any point in time preceding a process of interest in accordance with the condition/state at that point in time, or in accordance with the condition/state up to that point in time. If multiple "predetermined values" exist, each of these values may be different, or two or more of these values may be the same (which includes, of course, cases where all of these values are the same). Further, expressions that have the meaning of "if A, then B" is used to mean that "it is determined whether A, and then B if it is determined that A", unless it is not required to determine whether A.

Further, the term "system" or "apparatus" includes not only cases where a system or apparatus is made up of multiple components, such as computers, hardware components, or apparatuses that are connected to each other via a communication medium such as a network (including a one-to-one communication setup), but also cases where a system or apparatus is implemented by a single component such as a computer, a hardware component, or an apparatus. The terms "apparatus" and "system" are herein used synonymously. As a matter of course, the term "system" does not include what is merely a social "mechanism" (social system) which is a man-made arrangement of rules.

Further, for each process executed by each module or, if multiple processes are to be executed within a module, for each of the multiple processes, information of interest is read from a memory, and after execution of the corresponding process, the results of processing are written into the memory. Therefore, a description about reading of information from a memory prior to a process, or writing of information into a memory after a process will be sometimes omitted. The term "memory" as used herein may include a hard disk, a random access memory (RAM), an external storage medium, a memory using a communication line, and a register in a central processing unit (CPU).

An image processing apparatus 100 according to the exemplary embodiment has various transmitting applications (to be also referred to as "transmitting apps" hereinafter) for transmitting images. As illustrated in FIG. 1, the image processing apparatus 100 includes a contact list management module 105, a contact list storage module 110, a transmitting module 115, an image processing module 140, and an image storage module 145.

Although the exemplary embodiment will be directed to an example of the image processing apparatus 100 that transmits images, the image processing apparatus 100 may be any apparatus that transmits not only images but information (for example, text, audio, or moving-image information).

Examples of transmitting applications include facsimile transmission, Internet facsimile transmission, e-mail, file transfer, Multi-send, and Simple-FAX. Thus, the image processing apparatus 100 supports multiple transmission protocols (communication protocols). Examples of such protocols include CCITT-G4 for facsimile transmissions, simple mail transfer protocol (SMTP) for e-mail transmissions, and file transfer protocol (FTP) and server message block (SMB) for file transfers. The transmitting applications and the transmission protocols used are not limited to those mentioned above. Examples of transmitting applications and transmission protocols may include user-defined transmitting applications and uploads to cloud services. Conversely speaking, the image processing apparatus 100 may be any image processing apparatus capable of using multiple transmitting applications and multiple transmission protocols, and may not need to be able to use all of the transmitting applications and transmission protocols mentioned above.

Information indicative of a destination of transmission (to be referred to as destination information hereinafter) is defined for each transmission protocol. Examples of such destination information include FAX numbers (telephone numbers) for facsimile transmissions, e-mail addresses for Internet facsimile and e-mail, and IP addresses for file transfers (FTP or SMB). Destination information represents information for identifying a destination.

A contact name is a name indicative of a contact (information for identifying a contact). A contact name is given arbitrarily (or in accordance with an intention) by a person who has registered an entry into a contact list (also commonly called an address book). Examples of a contact name include a personal name (for example, a first name, a last name, a combination of a last name and a first name, a nickname, a pseudonym, a stage name, a pen name, or an abbreviation of each of these names), an organization name (including, for example, a company name, a department name, a group name, or a team name). In the contact list, each contact name is associated with zero or more pieces of destination information. This is because there are usually multiple transmission methods (such as facsimile transmission, e-mail, or file transfer) for transmitting data to a contact.

Multi-send as a transmitting application has the function of allowing the same information to be transmitted to different destinations at once by a single operation. As destination information, for example, a combination of a FAX number, an e-mail address, and an IP address for FTP or SMB may be designated. Multiple pieces of destination information may represent transmission addressed to a single contact (for example, transferring an e-mail and a file to the same person), or different pieces of destination information may be set for each contact (for example, facsimile transmission for Person A and e-mail for Person B).

Simple-FAX is a transmitting application with which attributes (for example, the resolution of an image) necessary for transmission are set in advance (or may be set by default) to obviate the need to set such attributes.

Hereinafter, facsimile transmission, Internet facsimile transmission, e-mail, file transfer (FTP), file transfer (SMB), Multi-send, and Simple-FAX will be described as examples of transmitting applications.

The contact list management module 105 is connected with the contact list storage module 110. The contact list management module 105 manages a contact list stored in the contact list storage module 110. For example, a pair of contact information (a contact name and an attribute of the contact) and destination information is registered into the contact list. Specifically, in accordance with an operator's operation, contact information and destination information may be entered, or a contact list created in advance may be imported. The contact list management module 105 may generate a contact list in which an attribute of a contact, and destination information are registered with a contact name left unregistered. Further, the contact list management module 105 may generate a contact list in which destination information is registered with an attribute of a contact also left unregistered.

Figure 12:
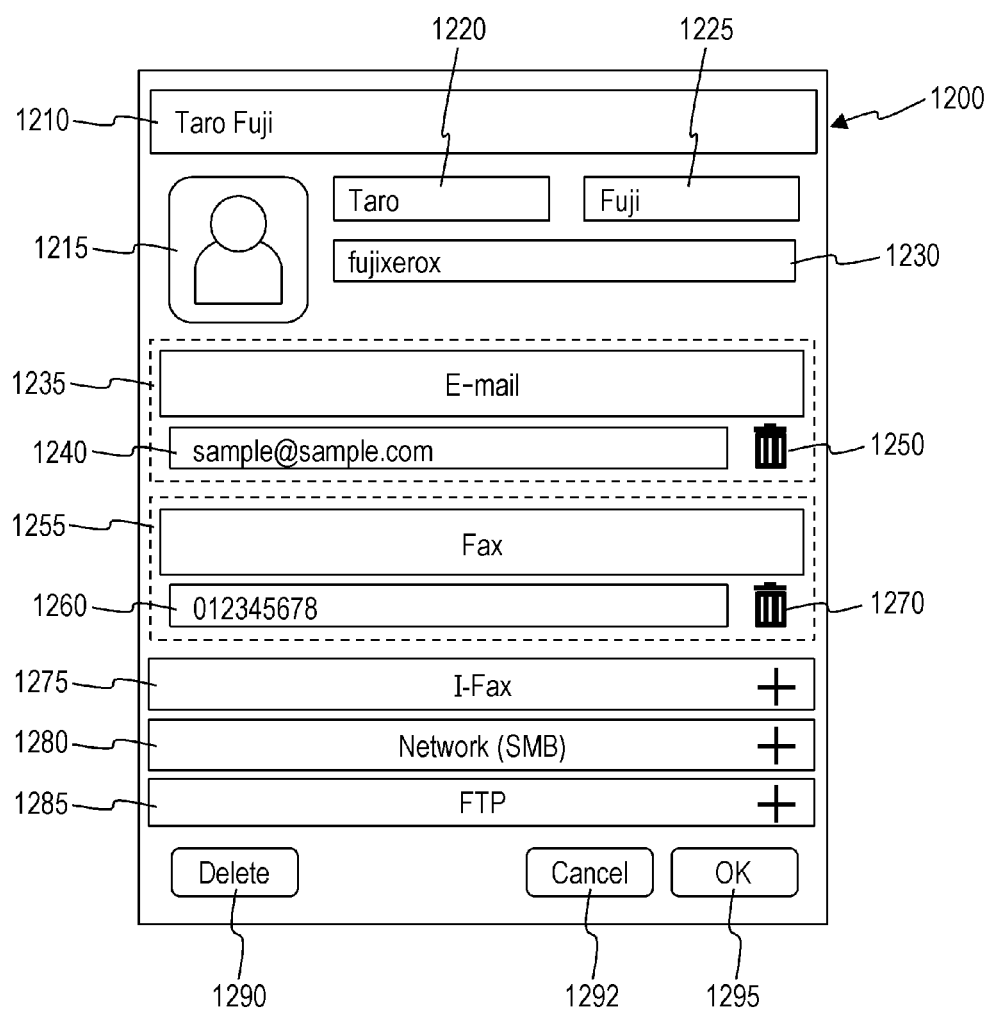
FIG. 12 illustrates an exemplary process according to the exemplary embodiment.

An example of how the contact list management module 105 creates a contact list will be described below with reference to FIG. 12. The contact list management module 105 presents a contact setting screen 1200 at the time of registration of information such as contact information or destination information. The contact setting screen 1200 is used to generate a contact table 500 described later.

The contact setting screen 1200 displays a contact field 1210, a contact photograph display area 1215, a first-name field 1220, a last-name field 1225, a company name field 1230, an E-mail field 1235, a FAX field 1255, an I-FAX field 1275, an SMB field 1280, an FTP field 1285, a delete button 1290, a cancel button 1292, and an OK button 1295. In this example, "Fuji Taro" is entered in the contact field 1210 as a contact name, "Taro" is entered in the first-name field 1220 as an attribute (first name) of the contact, "Fuji" is entered in the last-name field 1225 as an attribute (last name) of the contact, and "Fujixerox" is entered in the company name field 1230 as an attribute (company name) of the contact. An e-mail address and a FAX number are entered as destination information. Of course, selecting "+" in the I-FAX field 1275, the SMB field 1280, and the FTP field 1285 enables registration of respective addresses (an e-mail address for Internet FAX, and IP addresses) for Internet FAX, file transfer (SMB), and file transfer (FTP).

The E-mail field 1235 shows an address field 1240, and a delete button 1250. An e-mail address is entered into the address field 1240 by an operator's operation. Selecting the delete button 1250 deletes information entered in the address field 1240.

The FAX field 1255 shows an FAX number field 1260, and a delete button 1270. A FAX number is entered into the FAX number field 1260 by an operator's operation. Selecting the delete button 1270 deletes information entered in the FAX number field 1260.

Selecting the delete button 1290 deletes information such as contact information within the contact setting screen 1200. Selecting the delete button 1290 deletes entries made after display of the contact setting screen 1200. Selecting the OK button 1295 stores information such as contact information within the contact setting screen 1200 into the contact table 500.

The relationship between each of the fields within the contact setting screen 1200 and the contact table 500 (FIG. 5) will be described.

The contact field 1210 corresponds to a contact name field 514, the first-name field 1220 corresponds to a first-name field 516, the last-name field 1225 corresponds to a last-name field 518, the company name field 1230 corresponds to a company name field 520, the address field 1240 corresponds to an e-mail address field 524, and the FAX number field 1260 corresponds to a FAX number field 526.

The OK button 1295 may be selected with the contact field 1210 left blank. Further, the OK button 1295 may be selected with one or more of the first-name field 1220, the last-name field 1225, and the company name field 1230 left blank.

The contact list storage module 110 is connected with the contact list management module 105, and a contact selection module 125 of the transmitting module 115. The contact list storage module 110 stores a contact list for the image processing apparatus 100. Specifically, the contact list storage module 110 may store a single contact list for the image processing apparatus 100, rather than storing contact lists for individual users. That is, the operator of the image processing apparatus 100 uses the same contact list. Specific examples of a contact list include the contact table 500 illustrated in FIG. 5.

The transmitting module 115 includes a transmitting-app selection module 120, the contact selection module 125, and a transmission processing module 135. The transmitting module 115 performs processing related to transmission.

The transmitting-app selection module 120 selects a transmitting application in accordance with an operator's operation. For example, the transmitting-app selection module 120 selects one of the following transmitting applications: facsimile transmission, Internet facsimile transmission, e-mail, file transfer (FTP), file transfer (SMB), Multi-send, and Simple-FAX. A transmitting application may be associated with information such as transmitting service or transmitting mode.

The contact selection module 125 has a contact presentation module 130, and is connected with the contact list storage module 110. The contact selection module 125 receives destination information in accordance with an operator's operation. Destination information may be entered by the operator by using a device such as a keyboard or a touch panel. Alternatively, a contact list may be presented by the contact presentation module 130 to enable selection of a contact name (destination information) from the presented contact list.

Now, a case is considered in which there is no contact name registered in a contact list in which a contact name representing a name indicative of a contact and multiple pieces of destination information are associated with each other. In this case, the contact presentation module 130 presents a contact name including an attribute of the contact or destination information representing a destination of transmission for the transmitting application of interest.

The expression "the transmitting application of interest" as used herein refers to the transmitting application that is being currently selected by the operator.

If a contact name is unregistered and attributes are registered for a contact, the contact presentation module 130 may present a contact name by use of one or more of the attributes of the contact, including a first name, a last name, an organization name, and a combination of these names. In this case, the contact name may be presented in the following order of priority: a combination of a last name and a first name (which may be in the order of a last name followed by a first name or in the order of a first name followed by a last name), a first name, a last name, and an organization name. The contact presentation module 130 may allow setting of a rule that specifies which one of a first name, a last name, an organization name, and a combination of these names is to be used, or their order of priority. This rule is managed for each user.

If multiple transmission protocols are supported by a single transmitting application, the contact presentation module 130 may add an indication of the type of transmission protocol to destination information, and presents this as a contact name.

If multiple transmission protocols are supported by a single transmitting application, and the destination information for each of those transmission protocols is in the same format, the contact presentation module 130 may add an indication of the type of transmitting application to destination information, and presents this as a contact name.

The transmission processing module 135 is connected with the image storage module 145. The transmission processing module 135 transmits, by means of a transmitting application selected by the transmitting-app selection module 120, an image residing in the image storage module 145 to destination information selected by the contact selection module 125.

If selection of multiple pieces of destination information as destinations would lead to the same data being transmitted multiple times to identical pieces of destination information, the transmission processing module 135 may, prior to performing the transmission, change the destinations to a single piece of destination information.

The image processing module 140 is connected with the image storage module 145. The image processing module 140 receives an image, and causes the image to be stored into the image storage module 145. The receiving of an image may be, for example, reading of an image (scan data) with a scanner or other devices, receiving of an image from an external apparatus via a communication line by fax or other methods, or extracting of an image stored in a hard disk (including, other than a hard disk incorporated in a computer, a hard disk connected via a network). The image to be received may be a binary image or a multi-valued image (including a color image). The number of images to be recorded may be one, or two or more. The image is not limited to any particular type, and may be, for example, a document used for business purposes, or a brochure used for advertisement purposes.

The image storage module 145 is connected with the transmission processing module 135 of the transmitting module 115, and the image processing module 140. The image storage module 145 stores images to be transmitted.

Figure 2:
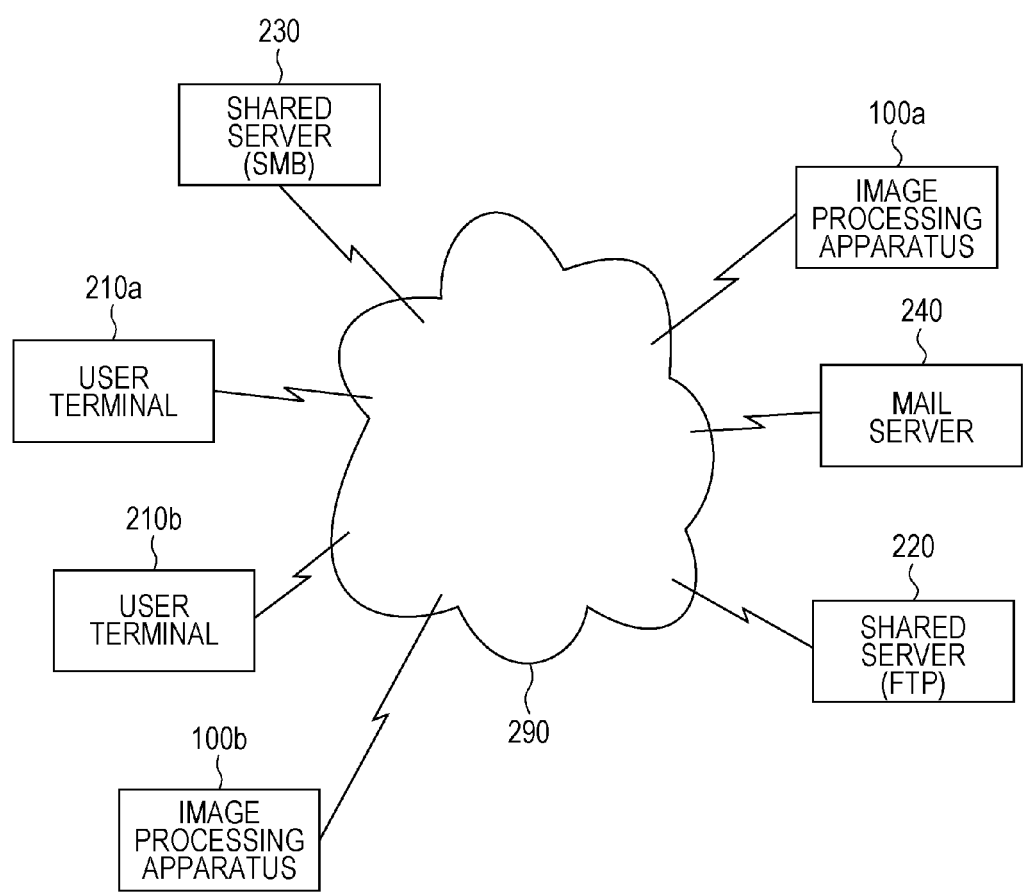
FIG. 2 illustrates an exemplary system configuration according to the exemplary embodiment.

FIG. 2 illustrates an exemplary system configuration according to the exemplary embodiment.

An image processing apparatus 100*a*, an image processing apparatus 100*b*, a user terminal 210*a*, a user terminal 210*b*, a shared server (FTP) 220, a shared server (SMB) 230, and a mail server 240 are connected to each other via a communication line 290. The communication line 290 may be a wireless communication line, a wired communication line, or a combination thereof. For example, the communication line 290 may be the Internet or an intranet as a communication infrastructure.

For example, the operator scans a document with the image processing apparatus 100*a*, and transmits the resulting image via e-mail to the operator himself or herself (User A, the user terminal 210*a*, and the mail server 240) and User B (the user terminal 210*b* and the mail server 240), who is the operator's supervisor. Further, the operator also stores the image into the shared server (FTP) 220 in which a folder shared by Group C to which the operator belongs resides, and into the shared server (SMB) 230 in which a folder used by User D resides, and transmits the image to User E by means of Internet FAX addressed to the image processing apparatus 100*b*.

In this case, multiple transmission protocols are used. Accordingly, using a transmitting application that supports Multi-send is more convenient than using individual transmitting applications (e-mail, file transfer (FTP), file transfer (SMB), and Internet facsimile transmission) for the transmission. In that case, it is assumed that the operator finds and selects User A, User B, Group C, User D, and User E from the contact list. For User A, a contact name is registered in the contact list. Thus, the contact name is presented. For User B, a contact name is unregistered, and a last name and a first name are registered in the contact list. Thus, a combination of the last name and the first name is presented as a contact name. For Group C, a contact name, a last name, and a first name are unregistered, and a company name is registered in the contact list. Thus, the company name is presented as a contact name. For User D, a contact name, a last name, a first name, and a company name are unregistered, and destination information is registered in the contact list. Thus, the IP address of the shared server (SMB) is presented as a contact name. For User E, a contact name, a last name, a first name, and a company name are unregistered, and destination information is registered in the contact list. Thus, the e-mail address for Internet FAX for the shared server (SMB) is presented as a contact name.

Figure 3:
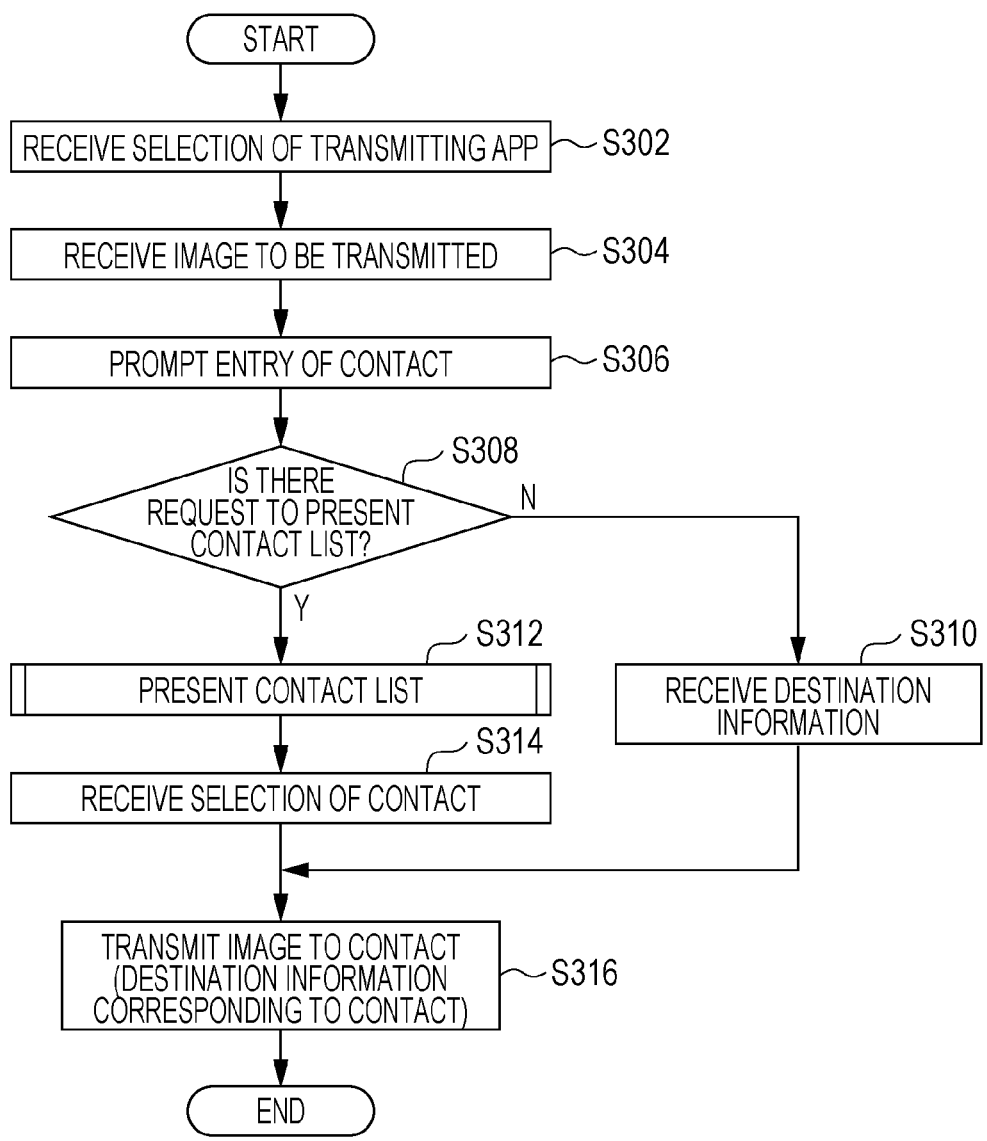
FIG. 3 is a flowchart of an exemplary process according to the exemplary embodiment.

FIG. 3 is a flowchart of an exemplary process according to the exemplary embodiment. This process represents the following series of steps: selection of a transmitting app, selection of an image to be transmitted, selection of a contact, and then transmission of the image.

At step S302, the transmitting-app selection module 120 receives a selection of a transmitting app in accordance with an operator's operation.

At step S304, the image processing module 140 receives, in accordance with an operator's operation, an image to be transmitted.

At step S306, the contact selection module 125 prompts the operator to enter a contact.

At step S308, the contact selection module 125 determines whether there is a request to present a contact list. The process proceeds to step S312 if there is such a request. Otherwise, the process proceeds to step S310.

At step S310, the contact selection module 125 receives destination information, and proceeds to step S316.

At step S312, the contact presentation module 130 presents a contact list. Step S312 will be described later in detail with reference to the flowchart illustrated in FIG. 4.

At step S314, the contact selection module 125 receives a selection of a contact.

At step S316, the transmission processing module 135 transmits the image to the contact (destination information corresponding to the contact).

Figure 4:
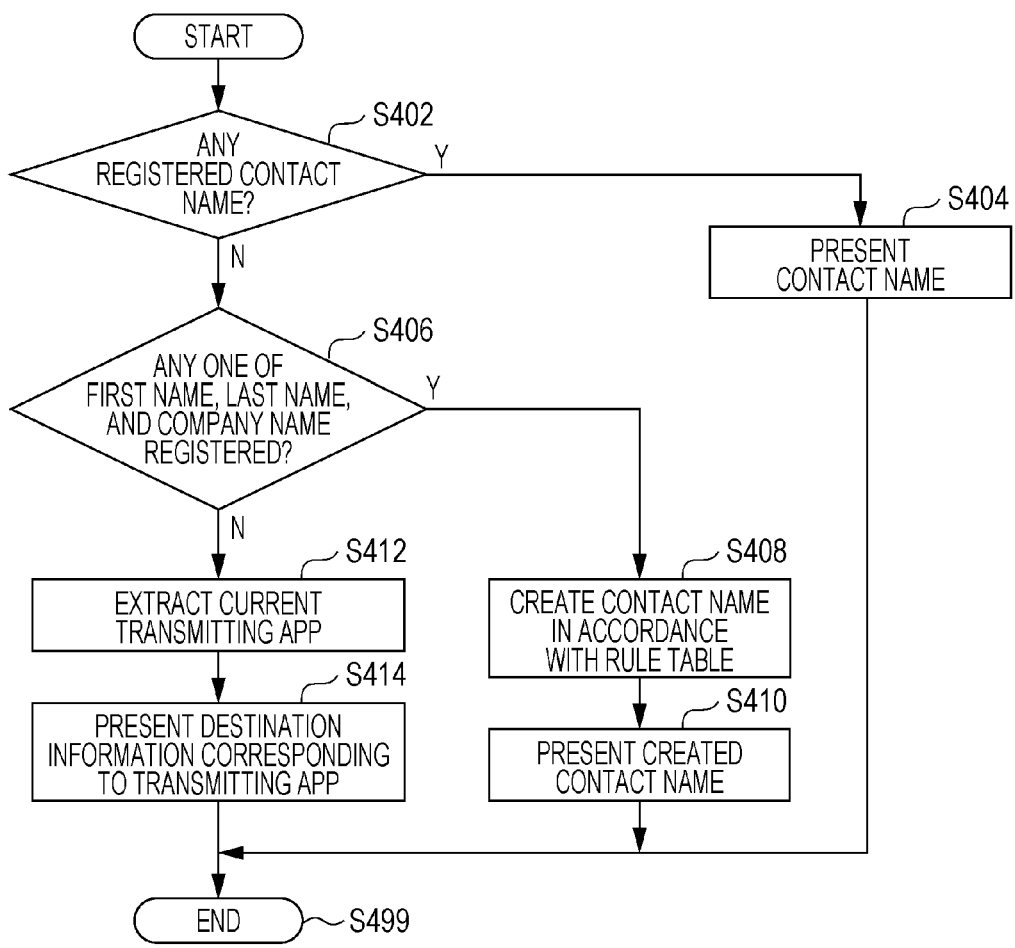
FIG. 4 is a flowchart of an exemplary process according to the exemplary embodiment.

FIG. 4 is a flowchart of an exemplary process according to the exemplary embodiment (performed by the contact presentation module 130). This flowchart illustrates details of step S312 of the flowchart illustrated in FIG. 3.

At step S402, it is determined whether there is a registered contact name. The process proceeds to step S404 if there is a registered contact name. Otherwise, the process proceeds to step S406. For example, this determination is made by determining whether the contact name field 514 of the contact table 500 is blank.

Figure 5:
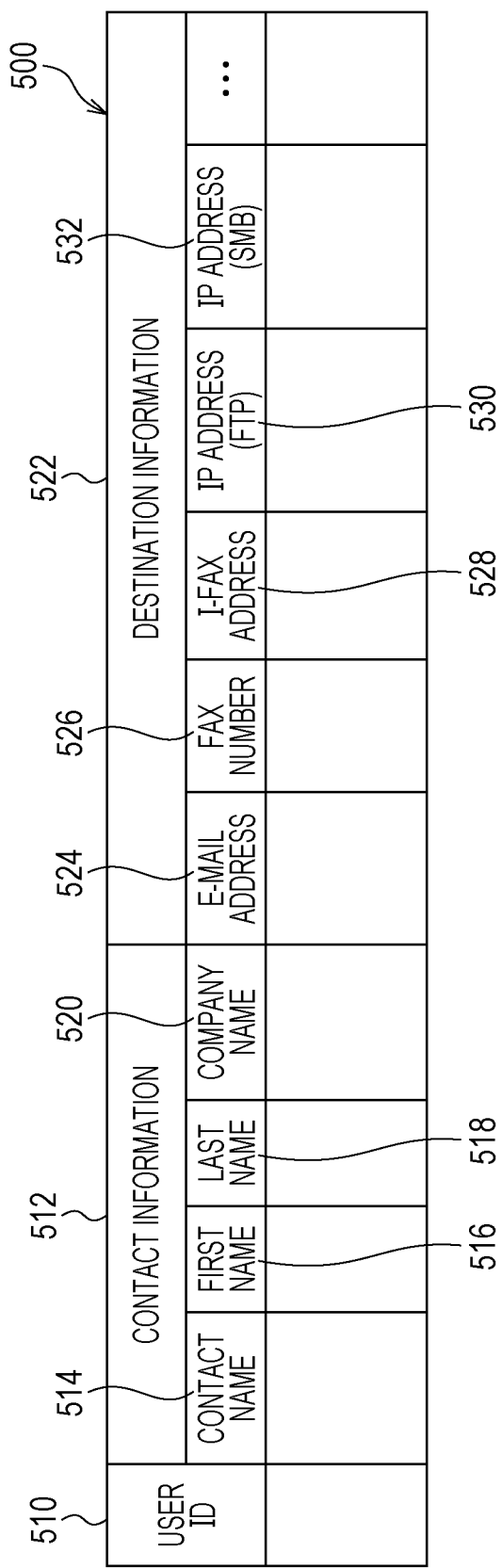
FIG. 5 illustrates an exemplary data structure of a contact table.

FIG. 5 illustrates an exemplary data structure of the contact table 500. The contact table 500 illustrates an exemplary data structure of a contact list. A single contact may be associated with zero or more (typically, multiple) pieces of destination information. This represents a so-called human-based contact list.

The contact table 500 has a user ID field 510, a contact information field 512, and a destination information field 522. The contact information field 512 has the contact name field 514, the first-name field 516, the last-name field 518, and the company name field 520. The destination information field 522 has fields such as the e-mail address field 524, the FAX number field 526, an I-FAX address field 528, an IP address (FTP) field 530, and an IP address (SMB) field 532.

The user ID field 510 stores information for uniquely identifying a user (user identification (ID)) according to the exemplary embodiment. The contact information field 512 stores contact information. The contact name field 514 stores a contact name. The first-name field 516 stores a first name. The last-name field 518 stores a last name. The company name field 520 stores a company name. Information entered in each of the first-name field 516, the last-name field 518, and the company name field 520 represents an attribute of a contact. The destination information field 522 stores destination information for transmitting data to the contact. The e-mail address field 524 stores an e-mail address. The FAX number field 526 stores a FAX number. The I-FAX address field 528 stores an e-mail address for Internet facsimile. The IP address (FTP) field 530 stores an IP address (FTP). The IP address (SMB) field 532 stores an IP address (SMB).

At step S404, the contact name is presented, and the process is ended (step S499).

At step S406, it is determined whether there is any one of a first name, a last name, and a company name. The process proceeds to step S408 if there is any one of these names. Otherwise, the process proceeds to step S412. For example, this determination is made by determining whether any one of the first-name field 516, the last-name field 518, and the company name field 520 of the contact table 500 is blank.

At step S408, a contact name is created in accordance with a rule table. As a rule table, for example, a rule table 600 is used. FIG. 6 illustrates an exemplary data structure of the rule table 600. The rule table 600 has a priority field 610, and a contact name candidate field 620. The priority field 610 stores a priority. The contact name candidate field 620 stores a contact name candidate.

As Priority: 1, a "combination of a first name and a last name" is displayed as a contact name. If one or both of the "first name" (the first-name field 516 of the contact table 500) and the "last name" (the last-name field 518 of the contact table 500) are blank, the process proceeds to Priority: 2.

As Priority: 2, a "first name" is displayed as a contact name. If the "first name" field is blank, the process proceeds to Priority: 3.

As Priority: 3, a "last name" is displayed as a contact name. If the "last name" field is blank, the process proceeds to Priority: 4.

As Priority: 4, a "company name" (the company name field 520 of the contact table 500) is displayed as a contact name.

The rule table 600 indicates the following rule. That is, if there are a last name and a first name as attributes, a combination of the last name and the first name is used. If there is only one of a last name and a first name, the last name or the first name is used. If there is neither a last name nor a first name, an organization name is used.

At step S410, the contact name created at step S408 is presented, and the process is ended (step S499).

At step S412, the current transmitting app is extracted.

At step S414, destination information corresponding to the transmitting app is presented. For example, a FAX number is presented if the current transmitting app is facsimile transmission, and an e-mail address is presented if the current transmitting app is e-mail.

As a result of step S404, step S410, and step S414, for example, a contact list presentation area 710 illustrated in FIG. 7 is presented on a screen 700. FIG. 7 illustrates an exemplary process according to the exemplary embodiment.

A contact list is presented in the contact list presentation area 710. The contact list presentation area 710 has a user ID field 720, a contact field 730, and a selection field 740. The user ID field 720 shows a user ID. The contact field 730 shows a contact. The selection field 740 shows a checkbox.

For User ID: 1, the contact name (the contact name field 514 of the contact table 500) "Fuji Taro" is displayed. For User ID: 2, the contact name and last-name fields are blank. Thus, Priority: 2 applies for this user, and the first name (the first-name field 516 of the contact table 500) "Jiro" is displayed. For User ID: 3, the contact name, first-name, and last-name fields are blank. Thus, Priority: 4 applies for this user, and the company name (the company name field 520 of the contact table 500) "FxxxXxxxx Corporation" is displayed. For User ID: 4, the contact name and first-name fields are blank. Thus, Priority: 3 applies for this user, and the last name (the last-name field 518 of the contact table 500) "Suzuki" is displayed. For User ID: 5, the contact name field is blank. Thus, Priority: 1 applies for this user, and the first name and the last name (the first-name field 516 and the last-name field 518 of the contact table 500) "Saburo Sato" is displayed. For User ID: 6, the contact name, the first-name, last-name, and company name fields are blank. Thus, the FAX number (the FAX number field 526 of the contact table 500) "0123456789" is displayed.

Figure 8:
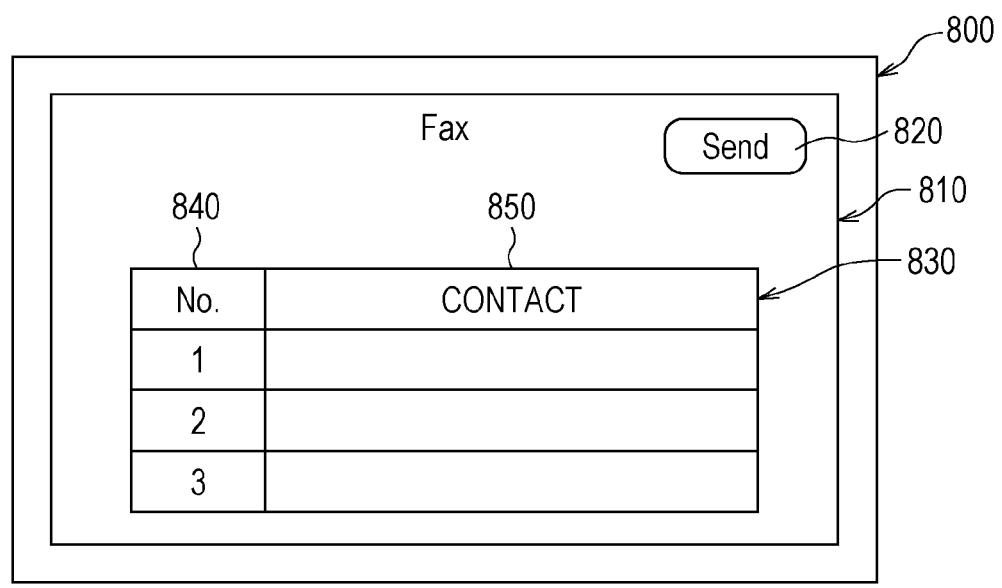
FIG. 8 illustrates an exemplary process according to the exemplary embodiment.

FIG. 8 illustrates an exemplary process according to the exemplary embodiment. This process represents a process in which, after a contact is selected at step S314 of the flowchart illustrated in FIG. 3, a transmitting operation made by the operator is received at step S316.

A screen 800 displays a display area used for transmitting app (facsimile) 810. The display area used for transmitting app (facsimile) 810 shows a Send button 820, and a target contact table 830. The target contact table 830 has a No. field 840, and a contact field 850. The No. field 840 shows a number. The contact field 850 shows a contact. The contact field 850 shows each contact name checked in the selection field 740 within the contact list presentation area 710 illustrated in FIG. 7. Facsimile transmission to a destination represented by destination information within the contact field 850 is performed when selection of the Send button 820 is detected.

Figure 9:
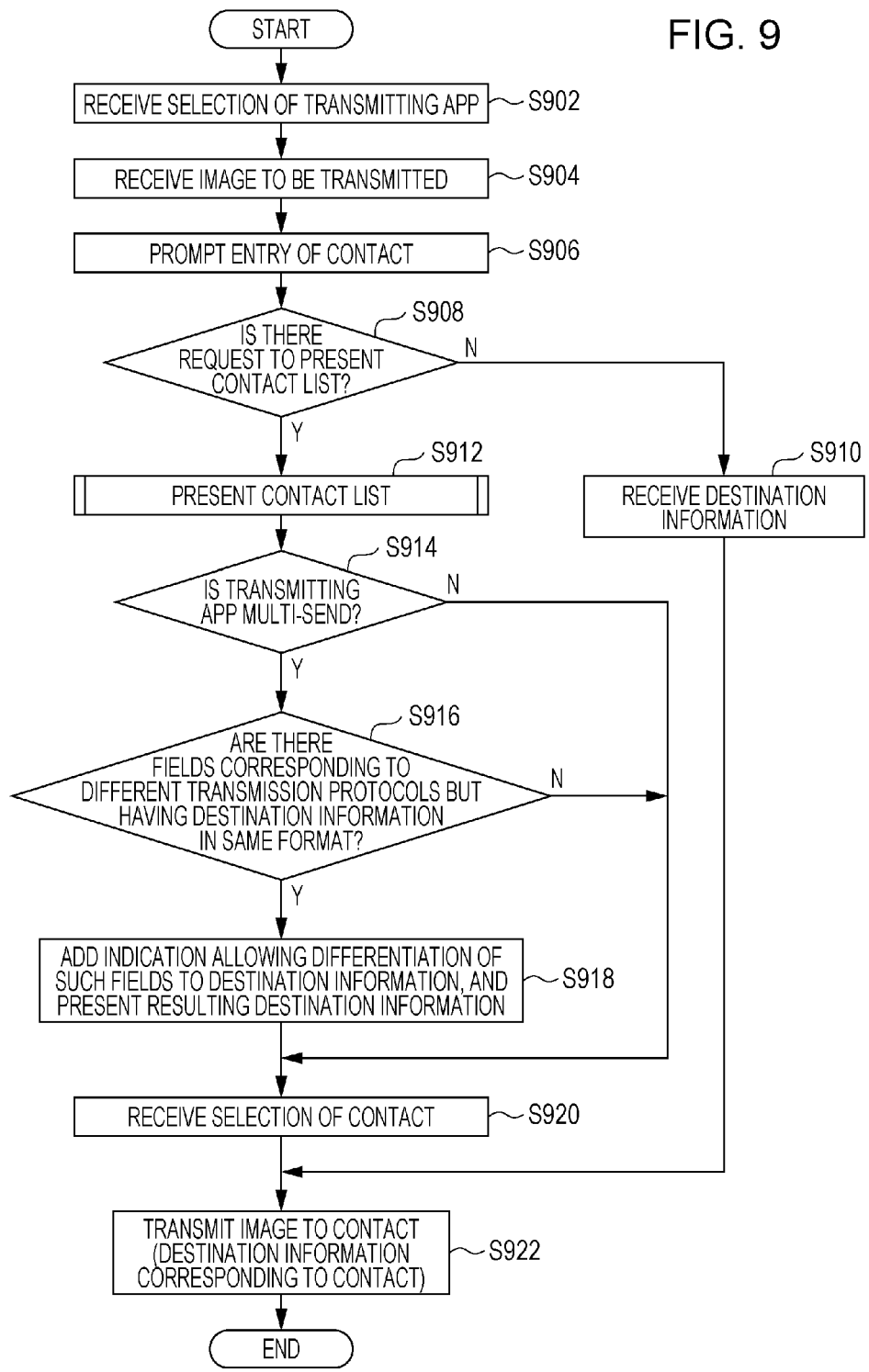
FIG. 9 is a flowchart of an exemplary process according to the exemplary embodiment.

FIG. 9 is a flowchart of an exemplary process according to the exemplary embodiment. This flowchart represents a process that determines whether the current transmitting app is Multi-send, and if the current transmitting app is Multi-send, adds an indication of information to destination information. Specifically, steps from S914 to S918 are added to the flowchart illustrated in FIG. 3.

At step S902, the transmitting-app selection module 120 receives a selection of a transmitting app in accordance with an operator's operation.

At step S904, the image processing module 140 receives, in accordance with an operator's operation, an image to be transmitted.

At step S906, the contact selection module 125 prompts the operator to enter a contact.

At step S908, the contact selection module 125 determines whether there is a request to present a contact list. The process proceeds to step S912 if there is such a request. Otherwise, the process proceeds to step S910.

At step S910, the contact selection module 125 receives destination information, and proceeds to step S922.

At step S912, the contact presentation module 130 presents a contact list. Step S912 have been already described in detail above with reference to the flowchart illustrated in FIG. 4.

At step S914, the contact presentation module 130 determines whether the current transmitting app is Multi-send. The process proceeds to step S916 if the current transmitting app is Multi-send. Otherwise, the process proceeds to step S920.

At step S916, the contact presentation module 130 determines whether there are fields that correspond to different transmission protocols but have destination information in the same format. The process proceeds to step S918 if such fields exist. Otherwise, the process proceeds to step S920.

At step S918, the contact presentation module 130 adds, to destination information, an indication of information that enables the above-mentioned fields to be distinguished from each other (an indication of the type of transmitting app), and presents the resulting destination information. For example, Internet facsimile transmission and e-mail use different transmission protocols, but their corresponding e-mail addresses as destination information are in the same format (made up of a user name and a domain name). When such an e-mail address is simply displayed, it is generally difficult for the operator to determine which one of the two transmitting applications this e-mail address corresponds to. Accordingly, for example, a character string such as "I-FAX" or "E-mail" is automatically added to the e-mail address for display. The character string "I-FAX" is added to an e-mail address extracted from the I-FAX address field 528 of the contact table 500, and the character string "E-mail" is added to an e-mail address extracted from the e-mail address field 524 of the contact table 500. Instead of character strings, symbols indicating Internet facsimile transmission or e-mail (including pictorial figures, icons, and other graphical representations) may be used. Further, although file transfer (FTP) and file transfer (SMB) use different transmission protocols, their corresponding IP addresses as destination information are in the same format (made up of a network address and a host address). In this case, each IP address is displayed in a URL format that enables identification of the corresponding transmission protocol. For example, this may be accomplished by any one of the following methods: displaying the IP address for file transfer (FTP) as "ftp://(IP address)" and the IP address for file transfer (SMB) as "smb://(IP address)"; displaying each IP address with a character string such as "FTP server" or "SMB server" added to the beginning of the IP address; and displaying each IP address with a symbol added to indicate the corresponding transmission protocol.

At step S920, the contact selection module 125 receives a selection of a contact.

At step S922, the transmission processing module 135 transmits the image to the contact (destination information corresponding to the contact).

Alternatively, step S916 may not be performed, and destination information with an indication of the type of transmission protocol added to the destination information may be presented as a contact name. That is, for Multi-send, irrespective of whether there are any pieces of destination information that are in the same format, an indication of the type of transmission protocol may be added to each piece of destination information. For example, the character string "E-mail" may be added for e-mail, the character string "FAX" may be added for facsimile transmission, the character string "I-FAX" may be added for Internet facsimile transmission, the character string "FTP server" may be added for file transfer (FTP), and the character string "SMB server" may be added for file transfer (SMB). As described above, rather than a character string, a symbol indicating the corresponding transmission protocol may be added for display.

Figure 10:
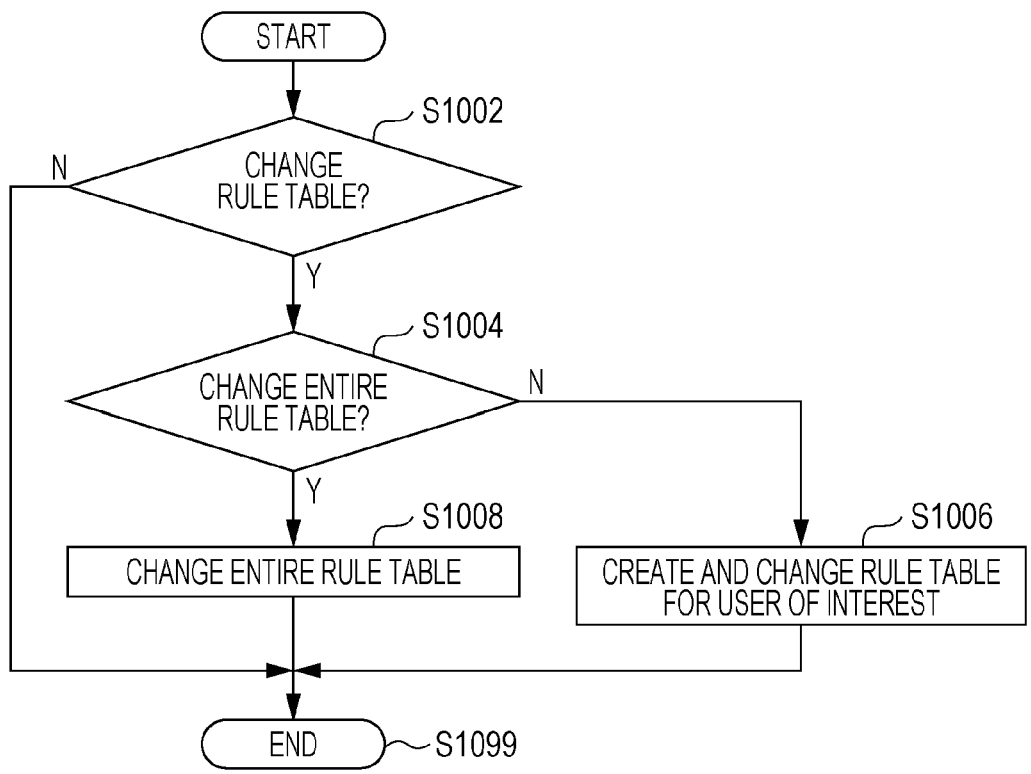
FIG. 10 is a flowchart of an exemplary process according to the exemplary embodiment.

FIG. 10 is a flowchart of an exemplary process according to the exemplary embodiment. This process allows for customization of the rule table 600.

At step S1002, it is determined whether to change the rule table 600. The process proceeds to step S1004 if the rule table 600 is to be changed. Otherwise, the process is ended (step S1099).

At step S1004, it is determined whether to change the entire rule table 600. The process proceeds to step S1004 if the entire rule table 600 is to be changed. Otherwise, the process proceeds to step S1006. The entire rule table 600 refers to a single rule table 600 stored for the image processing apparatus 100.

At step S1006, the rule table 600 for the user of interest is created and changed. This means that the rule table 600 is created for each user, and used for the user who is currently logging in the image processing apparatus 100.

At step S1008, the entire rule table 600 is changed.

Examples of changes to the rule table 600 may include changes to priority settings and changes to the contents of the contact name candidate field 620. For example, a combination of "company name", "first name", and "last name" may be added, or the order of a first name followed by a last name illustrated in FIG. 6 may be changed to the order of a last name followed by a first name.

Figure 11:
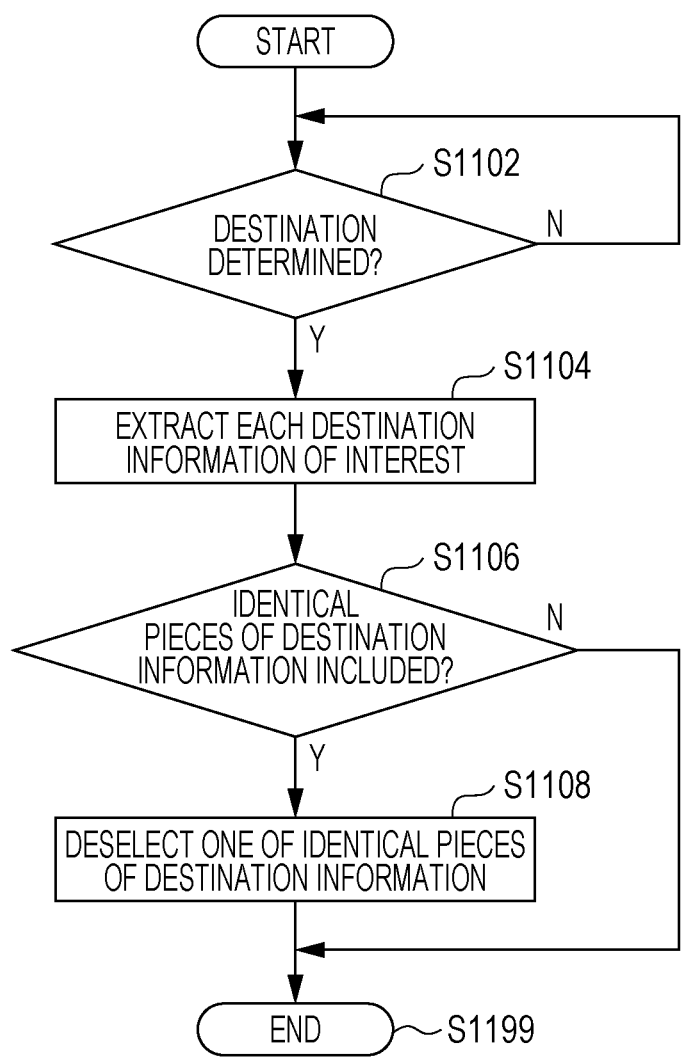
FIG. 11 is a flowchart of an exemplary process according to the exemplary embodiment.

FIG. 11 is a flowchart of an exemplary process according to the exemplary embodiment.

Multi-send enables designation of multiple destinations. If the operator enters the same contact multiple times by mistake, this results in the same data being transmitted multiple times. Since it is generally possible to copy a scanned image, transmitting the same image to the same contact (same destination information) multiple times results in an unnecessary process.

The process according to the flowchart illustrated in FIG. 11 may be performed immediately before step S316 of the flowchart illustrated in FIG. 3.

At step S1102, it is determined whether a destination has been determined. The process proceeds to step S1104 if a destination has been determined. Otherwise, the process waits until a destination is determined. Alternatively, step S1102 may "determine whether there has been an instruction to transmit".

At step S1104, each destination information of interest is extracted.

At step S1106, it is determined whether identical pieces of destination information are included. The process proceeds to step S1108 if identical pieces of destination information are included. Otherwise, the process is ended (step S1199).

At step S1108, one of the identical pieces of destination information is deselected. For example, if destination information identical to already entered destination information is entered later, the earlier entered destination information may be given precedence and the later entered destination information may be invalidated, and vice versa.

An exemplary hardware configuration of the image processing apparatus 100 according to the exemplary embodiment will be described below with reference to FIG. 13. The configuration illustrated in FIG. 13 is implemented by, for example, a personal computer (PC), and represents an exemplary hardware configuration including a data reading unit 1317, such as a scanner, and a data output unit 1318, such as a printer.

A central processing unit (CPU) 1301 is a controller that executes processes according to a computer program describing an execution sequence of various modules described above with reference to the exemplary embodiment, that is, modules such as the contact list management module 105, the transmitting module 115, the transmitting-app selection module 120, the contact presentation module 130, the transmission processing module 135, and the image processing module 140.

A read only memory (ROM) 1302 stores programs, operation parameters, and other information used by the CPU 1301. A random access memory (RAM) 1303 stores programs used for execution by the CPU 1301, parameters that change during the execution, and other information. The CPU 1301, the ROM 1302, and the RAM 1303 are connected to one another via a host bus 1304, such as a CPU bus.

The host bus 1304 is connected to an external bus 1306, such as a peripheral component interconnect/interface (PCI) bus, via a bridge 1305.

A keyboard 1308, and a pointing device 1309 such as a mouse are input devices operated by the operator. A display 1310 may be a liquid crystal display device or a cathode ray tube (CRT), and displays various information as text or image information. The display 1310 may be a touch screen or other devices including both the functions of the pointing device 1309 and the display 1310.

A hard disk drive (HDD) 1311 includes a hard disk (which may be a flash memory or other devices) built in the HDD 1311. The HDD 1311 drives the hard disk so as to record or reproduce a program or information executed by the CPU 1301. The hard disk is caused to implement the functions of modules such as the contact list storage module 110 and the image storage module 145. Further, various data, various computer programs, and other information are stored in the HDD 1311.

A drive 1312 reads out data or a program recorded on a removable recording medium 1313 loaded therein, such as a magnetic disk, an optical disc, a magneto-optical disc, or a semiconductor memory. The drive 1312 then supplies the data or program to the RAM 1303 connected to the drive 1312 via an interface 1307, the external bus 1306, the bridge 1305, and the host bus 1304. The removable recording medium 1313 may also serve as a data recording area.

A connection port 1314 is a port for connecting an externally connected apparatus 1315, and includes a connection unit such as a universal serial bus (USB) or IEEE1394. The connection port 1314 is connected to the CPU 1301 or other units via the interface 1307, the external bus 1306, the bridge 1305, the host bus 1304, or other components. A communication unit 1316 is connected to a communication line, and executes communication of data with an external apparatus. The data reading unit 1317 is, for example, a scanner, and executes reading of a document. The data output unit 1318 is, for example, a printer, and executes output of document data.

The hardware configuration of the image processing apparatus 100 depicted in FIG. 13 is only illustrative. The exemplary embodiment is not limited to the configuration illustrated in FIG. 13 but may employ any configuration that enables execution of the modules described above with reference to the exemplary embodiment. For example, some modules may be implemented by dedicated hardware (such as an application-specific integrated circuit (ASIC)), and some modules may be located within an external system and connected via a communication line. Further, multiple systems illustrated in FIG. 13 may be connected to each another by a communication line so as to operate in cooperation with each other. The above-mentioned configuration may be incorporated in, other than personal computers, in particular, portable information communication devices (including cellular phones, smart phones, mobile devices, wearable computers, and other devices), information home appliances, robots, copiers, facsimiles, scanners, printers, and multi-function machines (image processing apparatuses having two or more of scanner, printer, copier, facsimile, and other functions), for example.

In the exemplary embodiment mentioned above, the "combination of a last name and a first name" is presented in the order of a first name followed by a last name. This order may be changed in accordance with the location where the image processing apparatus 100 is placed (such that the order is a last name followed by a first name in Japan, and a first name followed by a last name in the United States), or may be changed in accordance with the display language of the image processing apparatus 100 (such that the order is a last name followed by a first name in Japanese, and a first name followed by a last name in English). Further, a middle name or other names may be added.

The expressions such as "to present" or "presentation" as used with reference to the above-mentioned exemplary embodiment may refer to, other than display of information on a display device such as a display, output of information as a three-dimensional (3D) image, or an action such as printing on a printing device, such as a printer, output of sound to an audio output device, such as a speaker, or a combination thereof.

The program described herein may be provided in the form of being stored on a recording medium, or the program may be provided via a communication unit. In that case, for example, the above-mentioned program may be understood as an exemplary embodiment of the invention related to a "computer readable recording medium recording a program".

A "computer readable recording medium recording a program" refers to a computer readable recording medium on which a program is recorded and which is used for purposes such as installing, executing, and distributing the program.

Examples of the recording medium include digital versatile discs (DVDs), such as "DVD-R, DVD-RW, DVD-RAM, or other types of DVDs", which are standards developed by the DVD Forum, and "DVD+R, DVD+RW, or other types of DVDs", which are standards developed by the DVD+RW alliance, compact discs (CDs) such as read-only memory (CD-ROM), CD-Recordable (CD-R), and CD-Rewritable (CD-RW) discs, Blu-ray (registered trademark) discs, magneto-optical discs (MOs), flexible disks (FDs), magnetic tapes, hard disks, read-only memories (ROMs), Electrically Erasable Programmable Read-only Memories (EEPROMs (registered trademark)), flash memories, random access memories (RAMs), and secure digital (SD) memory cards.

The entirety or a portion of the above-mentioned program may be recorded on the above-mentioned recording medium for purposes such as saving and distribution. Alternatively, the program may be transmitted by communication, for example, via a transmission medium such as a wired network or a wireless communication network which is used for a local area network (LAN), a metropolitan area network (MAN), a wide area network (WAN), the Internet, an intranet, an extranet, or other networks, or a combination thereof, or may be carried on a carrier wave.

Further, the program mentioned above may constitute a portion or the entirety of another program, or may be recorded on a recording medium together with a different program. Alternatively, the program may be recorded separately on multiple recording media. Furthermore, the program may be recorded in any format, such as compressed or encrypted, as long as the program may be restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a processor that causes a presentation unit to, if there is no contact name registered in a contact list, the contact list comprising a contact name representing a name indicative of a contact and a plurality of pieces of destination information associated with the contact, present a contact name from the contact list that includes an attribute of the unregistered contact name or destination information indicative of a destination of transmission for a transmitting application of interest,
 wherein the processor is configured to determine whether to present the contact name from the contact list that includes the attribute of the unregistered contact name or present the destination information indicative of the destination of transmission for the transmitting application of interest by:
  determining if an attribute of the unregistered contact name includes any one of a registered first name, last name, and/or organization name, then the contact name from the contact list that includes the attribute of the unregistered contact name is presented; and
  if the attribute of the unregistered contact name does not include any one of a registered first name, last name, and/or organization name, then the processor is configured to determine the transmitting application to be used for transmission, and the destination information corresponding to the transmitting application to be used for transmission is presented as the destination information indicative of the destination of transmission.

2. The information processing apparatus according to claim 1,
wherein if a contact name is unregistered and at least one attribute is registered for a contact, the presentation unit presents a contact name by use of one or more of the at least one attribute of the contact including a first name, a last name, an organization name, and a combination of a first name, a last name, and an organization name.

3. The information processing apparatus according to claim 2,
wherein the contact name is presented in a following order of priority: a combination of a first name and a last name, a first name, a last name, and an organization name.

4. The information processing apparatus according to claim 2,
wherein the information processing apparatus enables setting of a rule that specifies which one of a first name, a last name, an organization name, and a combination of a first name, a last name, and an organization name is to be used or their order of priority.

5. The information processing apparatus according to claim 4,
wherein the information processing apparatus has a contact list, and
wherein the rule is managed for each user.

6. The information processing apparatus according to claim 1,
wherein if a plurality of transmission protocols are supported by a single transmitting application, the presentation unit presents, as the contact name, destination information and an indication added to the destination information to indicate a type of transmission protocol.

7. The information processing apparatus according to claim 6,
wherein if a plurality of transmission protocols are supported by a single transmitting application, and destination information for each of the transmission protocols is in a same format, the presentation unit presents, as the contact name, destination information and an indication added to the destination information to indicate a type of transmitting application.

8. The information processing apparatus according to claim 1,
wherein if selection of a plurality of pieces of destination information as destinations leads to same data being transmitted a plurality of times to identical pieces of destination information, the destinations are changed to a single piece of destination information.

9. The information processing apparatus according to claim 1,
wherein the processor is further configured to act as:
a receiving unit that receives an image, and
a transmitting unit that transmits the image to destination information selected as a destination.

10. A non-transitory computer readable medium storing a program causing a computer to execute a process for processing information, the process comprising:
presenting, if there is no contact name registered in a contact list, the contact list comprising a contact name representing a name indicative of a contact and a plurality of pieces of destination information associated with the contact, presents a contact name from the contact list that includes an attribute of the unregistered contact name or destination information indicative of a destination of transmission for a transmitting application of interest, and
determining whether to present the contact name from the contact list that includes the attribute of the unregistered contact name or present the destination information indicative of the destination of transmission for the transmitting application of interest by:
determining if an attribute of the unregistered contact name includes any one of a registered first name, last name, and/or organization name, then the contact name from the contact list that includes the attribute of the unregistered contact name is presented; and
if the attribute of the unregistered contact name does not include any one of a registered first name, last name, and/or organization name, then determine the transmitting application to be used for transmission, and the destination information corresponding to the transmitting application to be used for transmission is presented as the destination information indicative of the destination of transmission.

11. An information processing method comprising:
presenting, if there is no contact name registered in a contact list, the contact list comprising a contact name representing a name indicative of a contact and a plurality of pieces of destination information associated with the contact, presents a contact name from the contact list that includes an attribute of the unregistered contact name or destination information indicative of a destination of transmission for a transmitting application of interest, and
determining whether to present the contact name from the contact list that includes the attribute of the unregistered contact name or present the destination information indicative of the destination of transmission for the transmitting application of interest by:
determining if an attribute of the unregistered contact name includes any one of a registered first name, last name, and/or organization name, then the contact name from the contact list that includes the attribute of the unregistered contact name is presented; and
if the attribute of the unregistered contact name does not include any one of a registered first name, last name, and/or organization name, then determine the transmitting application to be used for transmission, and the destination information corresponding to the transmitting application to be used for transmission is presented as the destination information indicative of the destination of transmission.

* * * * *